United States Patent
Brox

[11] Patent Number: 5,326,195
[45] Date of Patent: Jul. 5, 1994

[54] DIAMOND FILM CUTTING TOOL

[75] Inventor: Steven J. Brox, Ridgefield, Wash.

[73] Assignee: Norton Company, Worcester, Mass.

[21] Appl. No.: 134,512

[22] Filed: Oct. 8, 1993

Related U.S. Application Data

[63] Continuation of Ser. No. 848,617, Mar. 9, 1992, abandoned.

[51] Int. Cl.$^5$ .......... B23C 5/10; B23C 5/18; B23B 51/00; B23D 77/00
[52] U.S. Cl. .......... 407/32; 407/42; 407/118; 407/119; 408/144; 408/145
[58] Field of Search .......... 407/32, 34, 42, 51, 407/53, 54, 63, 118, 119; 408/144, 145

[56] References Cited

U.S. PATENT DOCUMENTS

| | | | |
|---|---|---|---|
| 3,803,950 | 4/1974 | Wasser | 407/53 |
| 4,762,445 | 8/1988 | Bunting et al. | 408/144 |
| 5,020,394 | 6/1991 | Nakamura et al. | 407/118 |
| 5,115,697 | 5/1992 | Rodriguez et al. | 407/119 |

FOREIGN PATENT DOCUMENTS

| | | | |
|---|---|---|---|
| 1211953 | 3/1960 | France | 407/118 |
| 1208397 | 8/1989 | Japan | 407/119 |

Primary Examiner—William E. Terrell
Attorney, Agent, or Firm—Volker R. Ulbrich

[57] ABSTRACT

A cutting tool having a diamond film cutting edge is disclosed. The tool may have a shear cutting angle of up to 25° while maintaining its durability and achieving a high degree of cutting efficiency.

17 Claims, 3 Drawing Sheets

DIAMOND FILM CUTTING TOOL

This is a continuation of copending application(s) Ser. No. 07/848,617 filed on Mar. 9, 1992, now abandoned.

FIELD OF THE INVENTION

The present invention is directed to fluted cutting tools that contain, as a part of their cutting face, a diamond film. The cutting tools, for example end mills, can be produced with shear angles of up to about 25°.

BACKGROUND OF THE INVENTION

The prior art is filled with a variety of cutting tools of different designs and compositional make-up. Various types of diamond compositions have been used to improve the cutting ability and wear of such tools. The most common type of diamond used in cutting tools is a diamond compact. Diamond compacts are a mixture of a binder, such as cobalt, and diamond powder. Such diamond compact materials are relatively thick, e.g. about 0.080" (2.03 mm), and relatively short in length, e.g. about 0.065" (1.65 mm) maximum. To install such diamond compacts in flutes of, for example, an end mill, it is necessary to remove a significant amount of the tool base material that forms the flute, so as to form a pocket (channel) for the insertion of the diamond compact. As a result of the removal of the tool base material from the flute, the flute is weakened. To produce a tool with a shear angle of greater than 0°, the flute must be angled, which requires cutting away even more of the flute material. The combination of the channeling of the flute to accommodate the diamond compact and the angling of the flute to create a shear angle weakens the tool and renders it incapable of being used in high shear applications. Moreover, the diamond compact contains cobalt which may react with the tool base material and cause the diamond compact to become overheated and wear away during use. As a result, a diamond end mill has never been successfully marketed on a large scale.

In one attempt to solve this problem, a fluted rotary tool of cemented carbide in which the cutting part is coated with a thin layer of polycrystalline diamond by a vapor phase synthetic method has been developed. The problem with this approach is that the adhesiveness between the cemented carbide and the diamond film has not proven to be sufficient to prevent stripping of the diamond film during use.

U.S. Pat. No. 5,070,748 discloses helical fluted tools which are a two-piece construction, i.e. the cutting portion is formed by electrical discharge machining (EDM) followed by packing in a polycrystalline diamond complex and hot isostatic pressing to hold the complex in position. This blank is then ground to the desired finish geometry and brazed by standard technology to a tungsten carbide shank which has been ground concentric thereto. A major problem in this tool is that the braze is being relied upon to absorb all the forces involved in cutting, and the braze cannot and does not hold up. In fact, in tests of tools prepared in accordance with this patent in composite machining applications, the tools failed very prematurely due to braze failure. Also, in the composite machining, the helix delaminated the composite material in the direction of the helix—an unacceptable result.

U.S. Pat. No. 5,020,394 discloses yet another method to overcome the problem encountered by the prior art tools. The tool is produced by forming, by a vapor phase synthesis method, a polycrystalline diamond film on the surface of a substrate which has been subjected to helical grinding; then subjecting the product to chemical treatment to remove only the substrate, brazing the resulting diamond film in a fluted form to at least a part of the rake face of a tool base metal and then subjecting the brazed tool base metal to working of a flank face to form a cutting edge. The tools produced are very expensive due to the complex technology required and furthermore a two-step brazing process is used which is both expensive and results in a poor quality bond.

Accordingly, it is an object of the present invention to construct a fluted cutting tool with a diamond cutting surface that is durable and inexpensive to manufacture.

It is another object of the present invention to construct a fluted cutting tool with a diamond cutting surface that has a cutting surface having a radial rake of greater than 0°, the radial rake angle being the angle between the rake face and a radius from the rotational axis of the tool to the cutting edge.

It is another object of the present invention to construct a fluted cutting tool in which the radial rake angle can be readily adjusted.

DISCLOSURE OF THE INVENTION

Accordingly, the present invention is directed to a cutting tool comprising a body member having an inner core and an outer surface. The body member is fluted at least along a portion of its length and contains at least two fluted sections. The degree of fluting, the number of fluted sections, the shape of the flute, and the length of the flute depends upon the particular tool. Each of the fluted sections defines a wedge shaped section having a cutting face (rake face) and a flank face which intersect each other.

The cutting surface is formed so that it has a shear angle of 0° or greater preferably greater and up to about 25°.

The cutting face contains a slotted channel or pocket at about the cutting edge portion of the cutting face extending parallel to and adjacent to the outer surface of the body member. Within the slotted channel is disposed a polycrystalline diamond film which is flush with the surface of the cutting face above the slot portion of the slotted channel and flush with the outer surface of the body member.

The diamond film is typically produced in thicknesses of from about 0.006 to 0.040" (0.15 to 1.02 mm). As a result, the channeling of the fluted sections need not remove very much of the body member material to accommodate the diamond film. The result is a stronger and more durable tool. In addition, the slot enables the diamond film to be more securely installed, making for an extremely durable cutting surface.

While the concept of using a slotted channel filled with a diamond film applies to a variety of different too it is particularly applicable to rounded or cylindrical tools such as end mills (cut on sides and ends), router bits (same as end mills but for higher speed operations and with more clearance), drill bits (make hole of specified diameter), reamers (sizes and shapes a drilled hole), countersinks (shapes the top or bottom of a drilled hole to accept a screw, rivet, or other fastener), and the like.

DETAILED DESCRIPTION OF THE PREFERRED EMBODIMENTS

Figure 1:
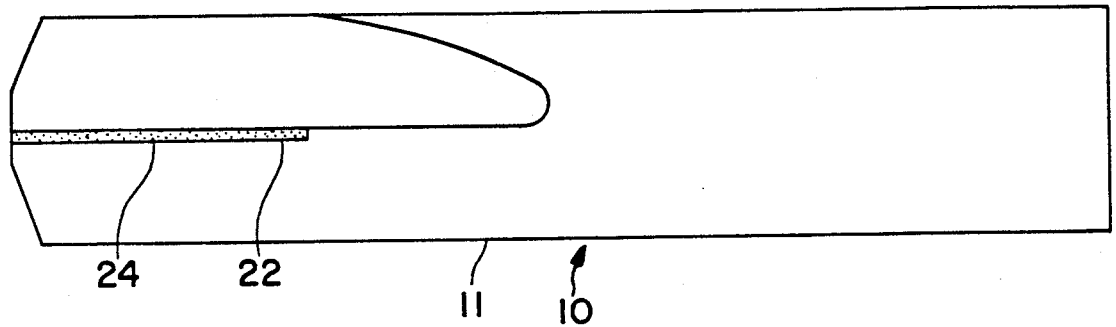
FIG. 1 is a side view of a cutting tool according to the present invention.
Figure 2:
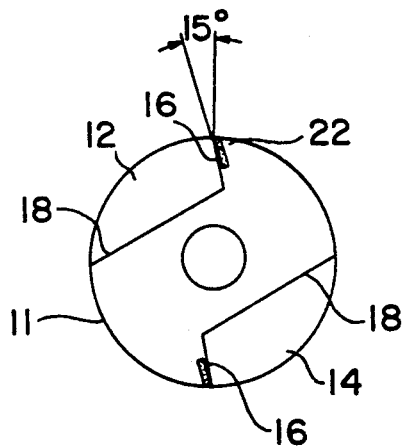
FIG. 2 is a front view taken along line 2—2 of the tool of FIG. 1.
Figure 3:
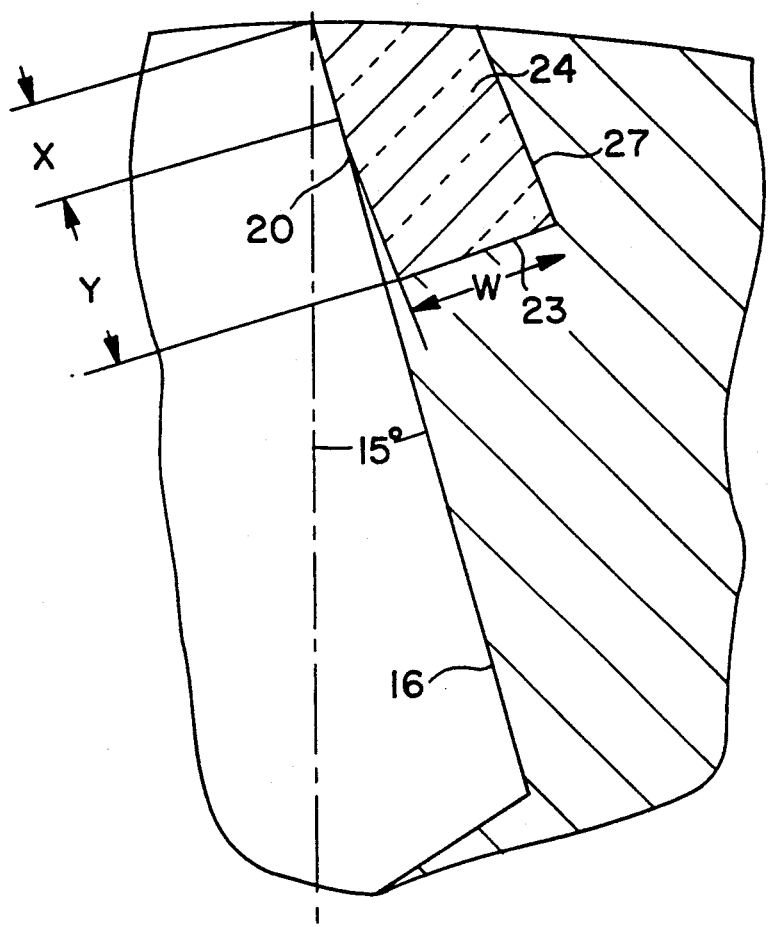
FIG. 3 is an enlarged, axial, cross-sectional view of the slotted channel of FIG. 2.

Referring to the drawings, FIGS. 1-3, show an end mill 10 comprising a body member 11 having two fluted sections 12 and 14. Each fluted section has a cutting face (rake face) 16 and a flank face 18. As best shown in FIG. 3, in the cutting face 16 at about the cutting edge portion 20 there is disposed a slotted channel 22. The slotted channel 22 has a polycrystal diamond film 24 disposed therein. Only the portion of the diamond film extending the length x along the surface of the cutting face 16 is not contained within the slot portion of the slotted channel 22, which extends the distance y along the cutting face 16. The slot portion is bounded on both sides and along its bottom 23 by the material forming the body member 11. The slot securely anchors the diamond film 11. As best shown in FIG. 1, the slotted channel 22 extends a distance DL along only a portion of the fluted section. This distance DL will depend upon the end use of the tool and the length of the flute. For example, the distance DL could be about equal to the length of the flute or, as shown, a length less than the flute length. The diamond film 24 which is contained in the slotted channel 22 may be a single piece or two or more sections may be inserted. Presently diamond films of the thicknesses described herein are available in lengths of up to about 4" (10.2 cm).

The slotted channel may be of any suitable length and width. Generally the width of the slotted channel is of from about 0.010 to 0.040" (0.254 to 1.015 mm), and most preferably of from about 0.015 to 0.025" (0.38 to 0.634 mm). The length of the slotted channel is of from about 0.25 to 4" (0.63 to 10.2 cm), more preferably of from about 0.5 to 2" (1.27 to 5.1 cm), and most preferably of from about 0.5 to 1.5" (1.27 to 3.81 cm). The slotted portion y is generally of from about 0.75 to 2" (1.88 to 5.1 cm) and the exposed cutting portion x is generally of from about 0.5 to 1.5" (1.27 to 3.81 cm).

The slotted channel design allows the diamond film to be securely positioned in the tool, which results in a rugged tool. Because the diamond film can be formed to thicknesses of only from about 0.006 to 0.40" (1.82 to 10.15 mm), the slotted channel width w can be kept to a minimum, resulting in a structurally superior tool to those in the prior art. In addition, and as shown in FIGS. 1 and 3, the cutting surface can be formed to have a radial rake angle of greater than 0°, preferably of about 5 to 25°, and most preferably of about 10 to 15°. FIG. 3 shows a tool with a shear angle of about 15°. As a result of the increased shear angle, the cutting efficiency of such a tool is significantly improved over prior art tools with shear angles of 0°.

The end mill of FIGS. 1-3 is preferably manufactured by first machining the slotted channels into a cylindrical body member 11. This is done by conventional techniques such as grinding, milling, or electrical discharge machining (EDM). The fluted sections 12 and 14 are then machined by a similar technique. The diamond film is then formed and machined, preferably by laser cutting to specification, to enable it to be fitted into the slotted channel 22. Then, the diamond film is attached into the slotted channel, preferably by a standard reactive brazing technique using a reactive metal braze paste. Reactive metal brazes are well known in the art and generally are based upon silver, gold, palladium, and the like although the chemical composition of the braze is not critical. In addition to the above metals, the braze further contains a metal capable of forming a carbide thereof at the interface with the diamond film, such as Ti, Ta, Cr, Mn, etc. Such metals are preferably present in an amount of about 0.5 to 10 vol. %. The brazing is preferably carried out by a method using an ordinary silver braze containing Ti or Ta in a controlled atmosphere.

An alternative and less preferred method of adhering the diamond film to the slotted channel entails coating the surface of the polycrystalline diamond film with a Ti film having a thickness of about 0.5 to 2 microns, then coating it with a Ni film having a thickness of about 1 to 10 microns by a PVD method, and then brazing the film with an ordinary silver braze.

The body member 11 of the tool 10 is preferably made of a cemented carbide alloy, although any suitable tool material such as steel may be employed. The body member preferably contains about 90 to 95% of fine tungsten carbide having a grain size of no more than about 1 micron and about 5 to 10 wt. % cobalt. Other components such as tantalum, nickel, or hafnium may also be incorporated.

The polycrystalline diamond film may be manufactured by any suitable technique known in the art which produces a diamond material with sufficient toughness for use in tool applications, including microwave plasma chemical vapor deposition (CVD) (generally described in Japanese Laid-Open Patent Appln. No. 58-100494), neutral ion CVD methods (generally disclosed in Japanese Laid-Open Patent Appln. No. 58-91100), plasma torch technology, or arc-jet processing. It is presently preferred to employ the arc-jet method to form the polycrystalline diamond film. The type of apparatus used for the arc-jet deposition is described, for example, in U.S. Pat. No. 4,682,564, the disclosure of which is incorporated herein by reference. Presently known methods generally involve the dissociation of hydrogen as a facilitating gas and methane as a carbon source by heating the gases to a plasma state with a hot wire, combustion torch, plasma torch, microwave source, arc jet, and the like. The heating occurs in a partial vacuum near the surface of a deposition substrate, such as silicon or molybdenum, to cause diamond to form as a layer thereon.

The diamond film employed in the cutting tool is characterized in that, although any polycrystalline diamond can be used, for cutting tool applications films exhibiting a high Young's modulus and a high thermal stability are preferred. Preferably, the Young's modulus is greater than about 1000 GPa and the thermal stability is greater than about 700° C. in air.

While an end mill is described in FIGS. 1-3, the concept of constructing a fluted tool with a slotted channel containing diamond film may be employed to make different end mills which contains three or more flutes and other round tools such as reamers, router bits, counter sinks, and drill bits.

Figure 4:
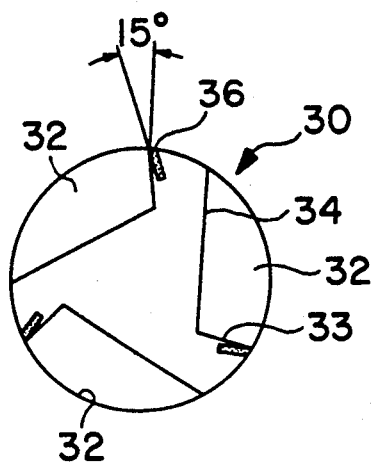
FIG. 4 is a front view of another cutting tool according to the present invention.

For example, FIG. 4 shows a front view of an end mill 30 similar to that described in FIGS. 1-3, but with three fluted sections 32 instead of two as in FIGS. 1-3.

The fluted sections have cutting faces 33 and flank faces 34 with a slotted channel 36 containing diamond film being disposed in the cutting face 33.

Figure 5:
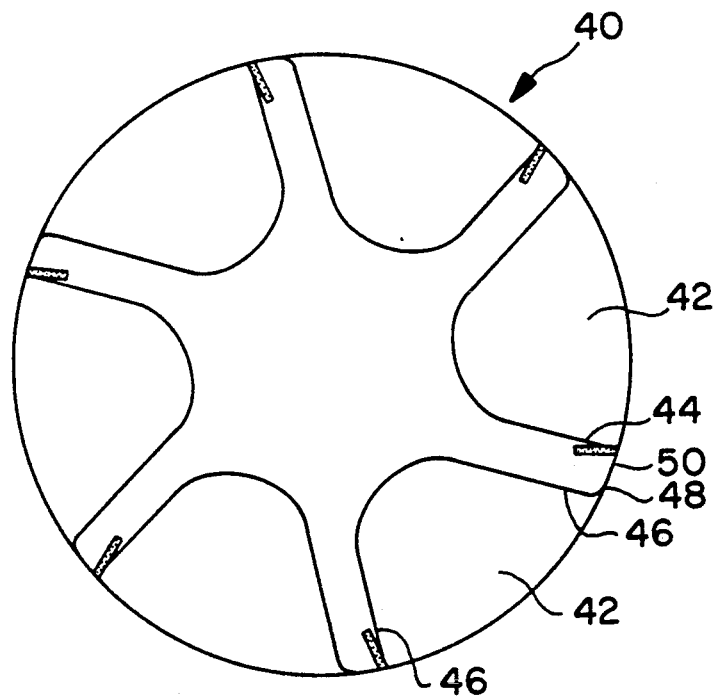
FIG. 5 is a front view of still another cutting tool according to the present invention.

FIG. 5 shows a front cross-sectional view of a reamer 40 with six fluted sections 42, each having a cutting surface 44 and a flank surface 46. As shown, a slotted channel 48 contains a diamond film 50.

The present invention will now be described with reference to the following Example, which should not be viewed as limiting the invention.

EXAMPLE I

An end mill of this invention was prepared. A cylindrical tunsten carbide bar 4" (10.2 cm) long and 0.5" (1.27 cm) in diameter was machined by grinding to form two slotted channels at opposite sides of the cylinder. The slotted channels were 0.035" (0.9 ram) in depth, 0.020" (0.5 ram) wide, and 0.75" (1.9 cm) in length. The resulting substrate was then machined by grinding to form two fluted sections. Each fluted section had a cutting face 0.375" (0.95 cm) deep and 1.125" (2.86 cm) in length. Each cutting face was positioned so that the slotted channel intersected the surface of the cutting face at about the peripheral edges of the body member. The cutting face was formed to possess a shear angle of 15°.

A polycrystalline diamond film was formed by the DC arc jet deposition techniques substantially as described in U.S. Pat. No. 4,682,564. The film had a thickness of 0.018" (0.46 mm), a Young's modulus of 1140 GPa and a thermal stability of above 700° C. in air. The diamond film was laser cut to the following dimensions: 0.04×0.75 inches (1×19.1 mm). The diamond film was then brazed into each of the slotted channels by induction brazing in a controlled argon atmosphere using a reactive braze containing silver-copper and titanium at a temperature of about 900° C. The diamond film, once in place, had an exposed surface 0.75" (19.1 mm) long that became part of, and flush with, the surface of the cutting face.

To complete the preparation of the tool, the edge was then ground to form a sharpened edge and to blend the diamond film into the profile of the substrate material.

EXAMPLE II

The performance of the end mill of Example I was compared with that of conventional end mills prepared from brazed diamond grit compact tools in the machining of aerospace composite materials which are laminates of carbon fiber reinforced graphite. Conventional end mills containing a diamond grit single layer, such as "MSL" of Norton Company currently operate for edge finishing at a rate of about 20 to 40 inches (51 to 102 cm) per minute These parameters cannot be exceeded, due to the amount of heat generated by the tools, which causes the tools to glaze and the composite part to glaze and delaminate.

In an initial test of the end mill of Example I, the tool was operated at the same parameters as the conventional tools. The finish on the composite part was judged to be superior with the present tool.

In succeeding operations, the tool of Example I was operated at a rate of 2 times the existing parameters for such tools. No heat build up was observed, and the finish on the part was excellent.

The tool was then operated at 3 and 4 times the existing parameters, up to a final machine speed of 125 inches per minute. No glazing, delamination or heat problems occurred. The diamond thick film edge held up extremely well.

Accordingly, the tool of Example I produced a 4 times greater benefit in composite machining per unit of time than the prior art tools and had a superior part finish.

What is claimed is:

1. A rotary cutting tool comprising a body member having an inner core of base material and an outer surface, said body member being fluted at least along a portion of its length and containing at least one fluted section defining a wedge-shaped section having a rake face ending at a cutting edge at the outer surface of the body member, said wedge-shaped section having a slotted channel disposed therein in the base material and extending parallel to and adjacent to the cutting edge of the body member, said slotted channel containing a chemical vapor deposited diamond film cutter element having a major surface which extends from its position in the slot to the outer surface of the body member to form the cutting edge and has a portion of its major surface exposed near the cutting edge so that said rake face includes a first, diamond film rake face surface segment extending away from the cutting edge and a second, base material rake face surface segment extending generally in a direction away from the cutting edge from the boundary of the first surface segment remote from the cutting edge, the radial rake angle of the second rake face segment being less than the angle between the plane of that portion of the major surface which lies in the channel and underneath the base metal rake face segment and a plane through the rotational axis and said boundary.

2. The cutting tool of claim 1, wherein there are at least two fluted sections.

3. The cutting tool of claim 1, wherein the second rake face surface segment is disposed at a radial rake angle of at least about 5°.

4. The cutting tool of claim 1, wherein the second rake face surface segment is disposed at a radial rake angle of at least about 5° to 25°.

5. The cutting tool of claim 1, wherein the second rake face surface segment is disposed at a radial rake angle of at least about 10° to 20°.

6. The cutting tool of claim 1, wherein the second rake face surface segment is disposed at a radial rake angle of at least about to 20°.

7. The cutting tool of claim 1, wherein the diamond film is from about 0.006 to about 0.040 inches thick.

8. The cutting tool of claim 1, wherein the diamond film is a single segment.

9. The cutting tool of claim 1, wherein the body member is substantially cylindrical in shape.

10. The cutting tool of claim 9, wherein the fluted section extends only a portion of the length of the body member.

11. The cutting tool of claim 1, wherein the diamond film extends only a portion of the length of the fluted section.

12. The cutting tool of claim 1, wherein the diamond film is a chemical vapor deposited diamond film grown by a low pressure deposition technique.

13. The cutting tool of claim 1, wherein the diamond film has a Young's modulus of at least about 1000 GPa.

14. The cutting tool of claim 1, wherein the diamond film is thermally stable to a temperature of at least about 700° C. in air.

15. The cutting tool of claim 1, wherein the tool is an end mill.

16. The cutting tool of claim 1, wherein the body member comprises tungsten carbide.

17. The cutting tool of claim 1, wherein the body member comprises steel.

* * * * *